Nov. 14, 1939.　　　J. R. GOGGINS　　　2,179,739
TRIPLICATE INDICATING DEVICE
Filed Sept. 11, 1937　　2 Sheets-Sheet 1
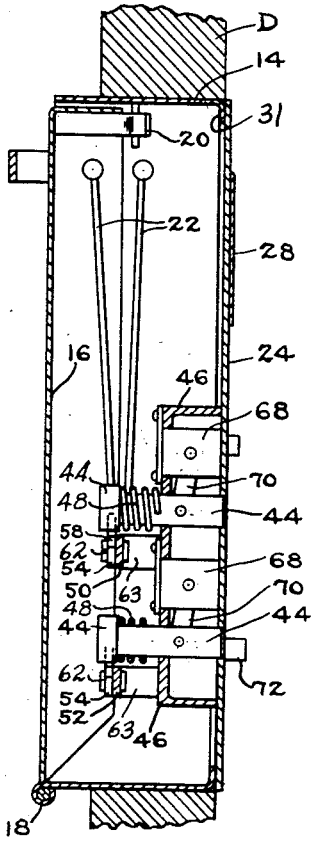
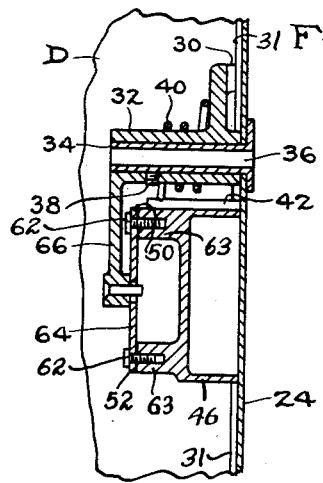
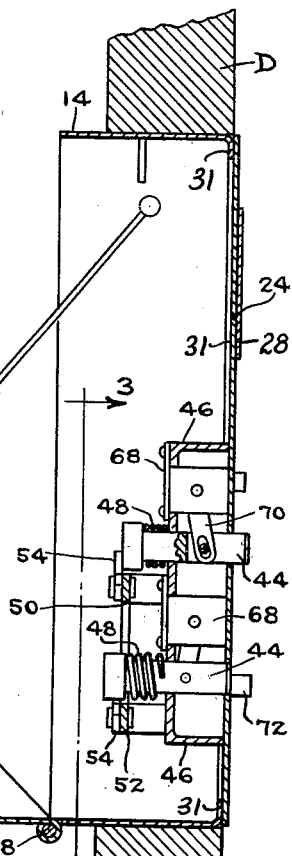
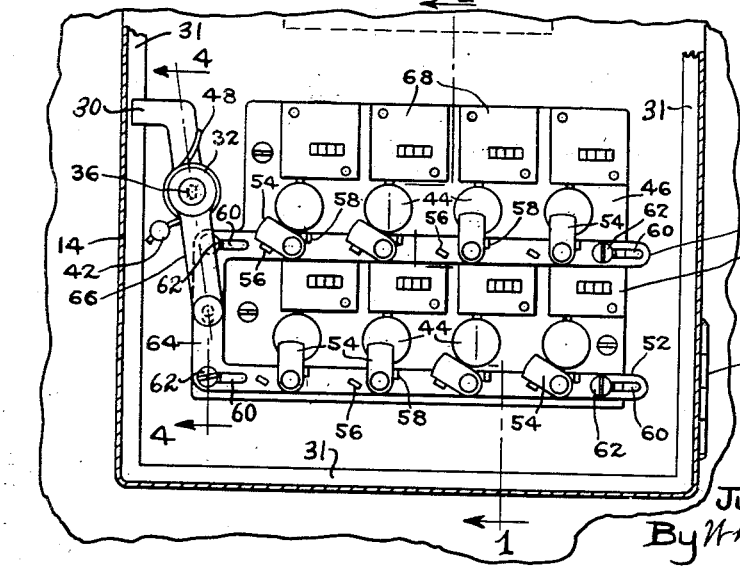
Inventor:
Juil R. Goggins.
By Whitely and Ruckman
Attorneys.

Nov. 14, 1939.    J. R. GOGGINS    2,179,739
TRIPLICATE INDICATING DEVICE
Filed Sept. 11, 1937    2 Sheets-Sheet 2

Inventor:
Juil R. Goggins.
By Whiteley and Ruckman
Attorneys

Patented Nov. 14, 1939

2,179,739

UNITED STATES PATENT OFFICE 2,179,739

TRIPLICATE INDICATING DEVICE

Juil R. Goggins, Minneapolis, Minn.

Application September 11, 1937, Serial No. 163,503

4 Claims. (Cl. 116—135)

My invention relates to triplicate indicating devices. The particular application of the invention which I have in mind is in connection with the delivery of commodities to customers. An object of the invention is to provide for making three indications in regard to the commodities, the first one being made at the residence of the customer, the second one involving an indication of the commodities delivered and which indication is taken away by the delivery man, there being separate indications for each customer, and the third indication being made at the central station where all of the indications brought back by deliverymen are placed on file.

The full objects and advantages of my invention will appear in connection with the detailed description thereof and the novel features embodied in my inventive idea will be particularly pointed out in the claims.

In the accompanying drawings which illustrate some of the forms in which my invention may be embodied:

Fig. 1 is a view in section on the line 1—1 of Fig. 3 showing the casing of a device set into the door or wall of a building, the casing being closed.

Fig. 2 is a sectional view similar to Fig. 1 but showing the rear door of the casing open and some of the plugs pushed forwardly.

Fig. 3 is a view in section on the line 3—3 of Fig. 2.

Fig. 4 is a view in section on the line 4—4 of Fig. 3 showing a locking device for the front door of the casing.

Figure 5:
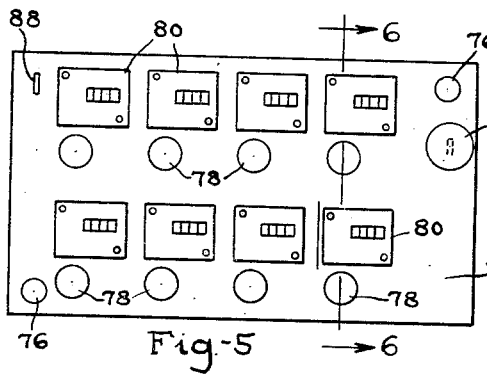
Fig. 5 is a front plan view of a device carried by the delivery man who has one of these devices for the residence of each customer.

In carrying out my invention, I provide a casing 14 which is set into an opening provided therefor which may be made in the door D of a building or if this is not convenient may be made in the wall of the building, the essential feature being that the casing shall be accessible both from front and back. The casing 14 is provided with a rear door 16 hinged at the bottom by a hinge 18 so that the door may be dropped from the position shown in Fig. 1 into the position shown in Fig. 2 when a latch 20 is released. In order to hold the door 16 in horizontal position when it is placed downwardly, one or more flexible elements 22 are attached at one end to the upper portion of the door and at the other end are attached to the upper side portion of the casing 14. When the door 16 is in the horizontal position shown in Fig. 2, it constitutes a shelf for receiving commodities delivered by a delivery man.

The front of the casing which is accessible to the outside of the building or a hallway thereof, is provided with a front door 24 hinged at 26 to the side of the casing 14 and carrying a name plate 28 if so desired. The door 24 is normally held in locked position by a latch 30 adapted to engage a flange 31 extending all the way around the front of the casing 14. The latch 30 as best shown in Fig. 4 is carried by a sleeve 32 which surrounds a tubular member 34 provided with a keyway 36. The member 34 is secured to the sleeve 32 by a set screw 38 in order that different keyways may be readily provided. A coiled spring 40 surrounds the sleeve 32 and is secured at one end to a pin 42 carried by the door 24 while the other end engages the latch 30 so that the door 24 may be held in locked position until the proper key is inserted in the keyway 36 for the purpose of turning the latch in opposition to the force exerted by the spring 40.

A plurality of plugs 44 are slidably mounted in a frame 46 carried inside of the front door 24 and are normally held rearwardly by springs 48 interposed between the frame 46 and heads on the rear ends of the plugs as will be understood from Figs. 1 and 2. There may be as many of the plugs 44 as desired marked to designate different commodities such as milk, cream, butter, eggs, bread, etc. One of the plugs may be marked to designate a credit plug while another of the plugs may be marked to designate the date. In the embodiment shown there are two horizontal rows of plugs. Bars 50 and 52 are connected to form a U-shaped structure by a crossbar 64. Each of the two bars 50 and 52 is formed with a slot 60 adjacent its ends through which extend screws 62 screwed into posts 63 on frame member 46, as clearly shown in Figs. 1 and 4. In this way the bars are slidably mounted by the screw and slot connection with the posts 63 and are caused to move as a unit by the connection of bars 50 and 52 to the member 64. The two bars 50 and 52 have dogs 54 pivoted thereon and adapted to have movement between stops 56 and 58 carried by the bars as will be understood from Fig. 3. There is one of the dogs 54 pivoted underneath each of the plugs 44. The front door 24 is provided with holes in register with the plugs 44 so that the housewife or customer may push forwardly any number of the plugs which are then held in forward position by turning up the corresponding dogs 54. By observing the plugs which have ben pushed forwardly, the delivery man will know what commodities he is expected to deliver and deposit upon the shelf door 16 after he has unlocked the front door 24. Mounted above each of the plugs 44 is a counter 68 which may be of well known or suitable construction. In order to operate the counters corresponding to the selected plugs which have been pushed forwardly, each counter is connected to the associated plug by an arm 70 the lower end of which is pivotally mounted in a slot in the plug as shown in Fig. 2. The counter is operated when the plug moves rearwardly into normal position. In case the housewife should operate any of the plugs and then wish to cancel the order before delivery is made, the corresponding dog 54 is pushed down to release the plug. The door 24 at one of its lower corners is provided with a forwardly projecting guide pin 72 and with a similar guide pin at its diagonally opposite upper corner for a purpose which will now be referred to.

Figure 6:
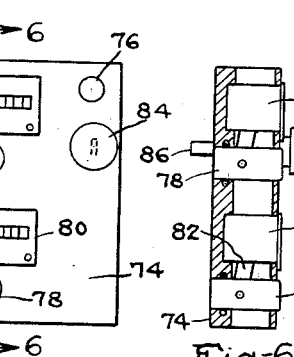
Fig. 6 is a view in section on the line 6—6 of Fig. 5 with the plugs in normal position.

In order that the delivery man may unlock the front door 24 of the casing 14 and place the desired commodities upon the shelf door 16 and at the same time obtain records of his delivery, he is provided with devices such as shown in Figs. 5 and 6, one for each customer. This device consists of a plate or supporting member 74 provided with guide holes 76 in which the guide pins 72 previously referred to are received. The plate 74 is also provided with slidable plugs 78 adapted to register with the plugs 44, so that the ones of those latter plugs which have been set forwardly will push forwardly the corresponding plugs 78. The plate 74 above the plugs 78 is provided with counters 80 similar to the counters 68, the counters 80 being connected to the associated plugs 78 by arms 82 so that the counters 80 will make the same count as was made by the counters 68 which were previously operated by the plugs 44 on their rearward movement. The plate 74 also carries a knob 84 having a shank whose rear end is provided with a key 86 which is shaped to fit only the particular key hole 36 associated with the door 24. When the delivery man applies the proper plate 74, he will withdraw the latch 30 upon turning the knob 84 in proper direction to move the latch toward the right as viewed in Fig. 3. At the same time, the arm 66 will move the bars 50 and 52 toward the left in this figure thereby causing the upstanding dogs 54 to move past the ends of the plugs 44 and releasing all of the plugs 44 which had been pushed forwardly so that they will return to normal rearward position ready for another setting. The return of the bars 50 and 52 to normal position causes the upstanding dogs to move into their down position. The plates 74 in one corner thereof are provided with serial numbers 88 for identification purposes, these numbers corresponding to the numbering of the keys 86.

Figure 8:
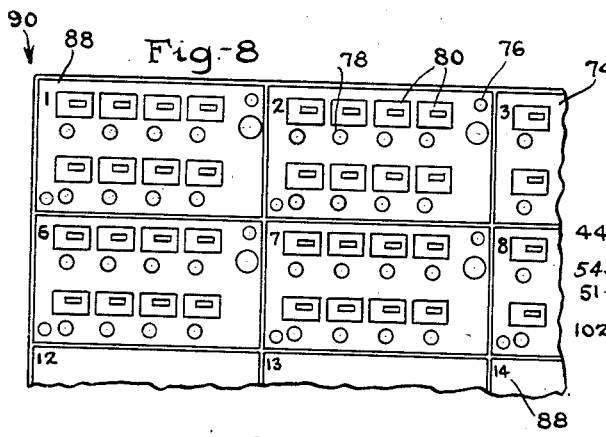
Fig. 8 is a fragmentary front plan view of a rack which is carried in the delivery vehicle for holding a plurality of the devices, one of which is shown in Figs. 5 and 6.
Figure 9:
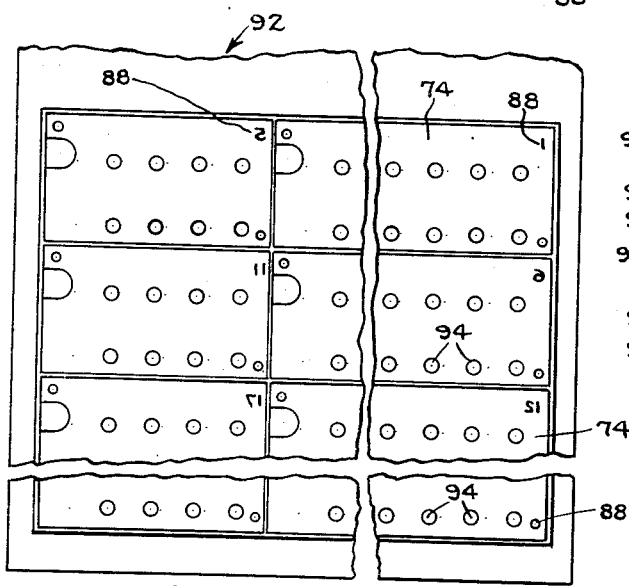
Fig. 9 is a rear elevational view of another rack placed in the central station for receiving the devices of Figs. 5 and 6 which are brought back by the delivery man.
Figure 10:
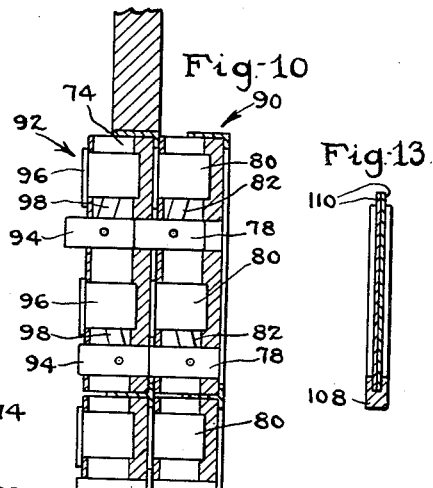
Fig. 10 is a cross sectional view showing the face of the rack of Fig. 8 engaged with the rear of the rack of Fig. 9.

Fig. 8 shows a rack 90 which is carried in the delivery vehicle and into which the delivery man puts the plates 74 in their proper places after he has made the delivery. When the delivery man has made his rounds, the rack 90 carrying the plates 74 corresponding to his deliveries is taken from the vehicle, and put in its proper place in a rack 92 shown in Fig. 9 located in the central station where the complete count is kept. As shown in Fig. 10, the face of the rack 90 is engaged with the rear of the rack 92 and the latter rack is provided with plugs 94 corresponding to the plugs 78. The rack 92 is also provided with counters 96 connected by arms 98 with the plugs 94. Therefore when the rack 90 is engaged with the rack 92, the plugs 94 corresponding to the projected plugs 78 will be pushed out and the associated counters 96 will be operated to make a complete record of the deliveries which have been made.

Figure 11:
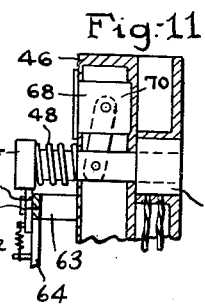
Fig. 11 is a sectional view of one of the plugs shown in Fig. 1 and showing it adapted to be operated by a solenoid.

Fig. 11 shows a modified construction in which the support 46 carries plugs 44 normally held retracted by springs 98 and the counters 68 are connected by arms 70 with the plugs 44. These plugs however instead of being pushed forwardly by hand are adapted to be drawn forwardly by solenoids 100 in which the plugs act as core members. When the solenoids 100 are energized in any suitable manner the selected plugs will be projected and retained in this position by dogs 54 which in this form are urged upwardly by springs 102.

Figure 12:
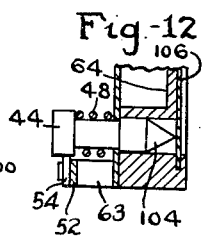
Fig. 12 is a sectional view of another form of plug showing it with a pointed end for perforating a card.
Figure 13:
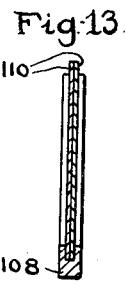
Fig. 13 is a sectional view showing that a plurality of cards may be placed in a frame to be carried by the delivery man in place of the device shown in Figs. 5 and 6.

Fig. 12 shows another modification in which the forward ends of the plugs are pointed as indicated at 104. The support 46 as shown holds a card 106 which will be perforated by the pointed end 104 when the plug is moved forwardly into indicating position. It will be understood as a matter of course that each position of perforations in the cards is for giving different indications such as the kind of commodity or to indicate a charge account. Fig. 13 shows a frame 108 to be carried by the delivery man in place of the device shown in Figs. 5 and 6. This frame is adapted to hold two cards 110, and will as a matter of course be provided with guide holes similar to the guide holes 76 adapted to receive guide pins similar to the guide pins 72 when the frame 108 is pushed against the support for the card 106. When any of the plugs having the pointed ends 104 is placed in forward indicating position, the point 104 will extend out beyond the card 110 so that upon registering the frame 108 with the support for the card 106, the two cards 110 will be similarly perforated and a triplicate indication will thus be made.

The operation and advantages of my invention will be apparent from the foregoing description and the accompanying drawings. Some of the advantages involved in the use of the device for giving indications connected with the delivery of commodities may be summarized as follows:

1. Time saver; 2. Accurate; 3. Convenient; 4. Economical and cuts office expenses; 5 Prevents stealing of commodities; 6. Provides for giving triplicate indications.

Figure 7:
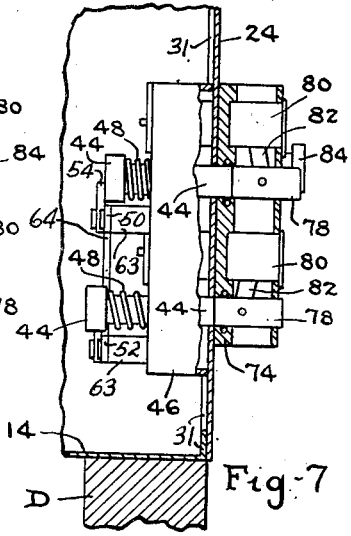
Fig. 7 is a cross sectional view showing one of the units of Figs. 5 and 6 positioned upon the device shown in Figs. 1 and 2.

When the delivery man makes a delivery, he will know by the plugs which have been placed by the customer in indicating position, what commodities he is expected to deliver. Upon properly positioning the device carrying the key corresponding to the particular customer, the front door of the casing is readily unlocked, and the delivery man deposits the indicated commodities upon the shelf door 16. He may easily push this door down into the position shown in Fig. 2. When he turns the knob 84 to unlock the door 24, the bars 50 and 52 will be moved toward the left in Fig. 3, and all of the dogs 54 which are in vertical retaining position will be moved into releasing position, so that the plugs which had been placed in indicating position will return to normal position. In doing this the corresponding counters 68 will be operated. It will be further understood that when the delivery man applies the supporting member 74 as shown in Fig. 7, the plugs 76 carried thereby corresponding to the plugs 44 which had been set in indicating position will be moved and thus operate the corresponding counters 80. These indications thus obtained by the delivery man for each customer are finally taken by him to the central station and complete indications obtained there as previously explained and as will be understood from Figs. 9 and 10. After the plugs of the device carried by the deliveryman and those at the central station have been operated, these plugs will of course be returned to normal position.

I claim:

1. In a device of the character described, the combination of a casing, a plurality of plugs for indicating commodities slidably mounted in said casing adapted to be separately moved outwardly into indicating position, resilient means normally holding said plugs in retracted position, a slidable bar extending transversely adjacent the path of movement of said plugs, releasable dogs carried by said bar and associated with said plugs respectively for holding them in indicating position in opposition to the tension of said resilient means, an arm pivotally connected at one end with said bar, and a tubular member to which the intermediate portion of said arm is secured, said tubular member being mounted in said casing for rotative movement and extending to the outside of said casing whereby upon turning said tubular member the said bar is slid to release said dogs.

2. In a device of the character described, the combination of a casing, two rows of plugs for indicating commodities slidably mounted in said casing, said plugs being adapted to be separately moved outwardly into indicating position, resilient means normally holding said plugs in retracted position, two slidable bars one of which extends transversely adjacent the path of movement of the plugs of one of said rows and the other of which extends transversely adjacent the path of movement of the plugs of the other of said rows, a connecting member between said bars, an arm pivotally attached to said connecting member for sliding said bars in unison, releasable dogs carried by said bars and associated with said plugs respectively for holding them in indicating position in opposition to the tension of said resilient means, and means for operating said arm from the outside of said casing for sliding said bars to release said dogs.

3. In a device of the character described, the combination of a casing, a plurality of plugs for indicating commodities slidably mounted in said casing adapted to be separately moved outwardly into indicating position, resilient means normally holding said plugs in retracted position, a slidable bar extending adjacent the path of movement of said plugs, dogs pivoted to said bar associated with said plugs respectively adapted to be manually turned from a position out of the path of movement of said plugs into a position in engagement with the plugs to hold them in their outward indicating position, and means for sliding said bar to release said dogs from their engagement with said plugs.

4. In a device of the character described, the combination of a casing, a plurality of plugs for indicating commodities slidably mounted in said casing adapted to be separately moved outwardly into indicating position, resilient means normally holding said plugs in retracted position, a slidable bar extending adjacent the path of movement of said plugs, dogs pivoted to said bar associated with said plugs respectively adapted to be manually turned from a position out of the path of movement of said plugs into position in engagement with the plugs to hold them in their outward indicating position, stops carried by said bar for limiting the pivotal movement of said dogs, and means for sliding said bar to release said dogs from their engagement with said plugs.

JUIL R. GOGGINS.